United States Patent
Lorgeoux et al.

(10) Patent No.: US 9,344,216 B2
(45) Date of Patent: May 17, 2016

(54) ERROR CONCEALMENT METHOD FOR WIRELESS COMMUNICATIONS

(75) Inventors: Mickaël Lorgeoux, Rennes (FR); Mounir Achir, Chantepie (FR)

(73) Assignee: Canon Kabushiki Kaisha, Tokyo (JP)

( * ) Notice: Subject to any disclaimer, the term of this patent is extended or adjusted under 35 U.S.C. 154(b) by 685 days.

(21) Appl. No.: 13/546,895

(22) Filed: Jul. 11, 2012

(65) Prior Publication Data

US 2013/0038796 A1 Feb. 14, 2013

(30) Foreign Application Priority Data

Jul. 13, 2011 (GB) .................................. 1112017.7

(51) Int. Cl.
*H04L 1/00* (2006.01)
*H04N 19/895* (2014.01)

(52) U.S. Cl.
CPC ............ *H04L 1/0045* (2013.01); *H04N 19/895* (2014.11)

(58) Field of Classification Search
CPC ..................................................... H04N 19/89
USPC .................................................... 375/240.27
See application file for complete search history.

(56) References Cited

U.S. PATENT DOCUMENTS

| 8,605,797 B2* | 12/2013 | Shao et al. | ............... 375/240.27 |
| 2006/0013320 A1* | 1/2006 | Oguz et al. | ............... 375/240.27 |
| 2009/0021646 A1* | 1/2009 | Shao et al. | .................... 348/608 |
| 2010/0322309 A1* | 12/2010 | Huang et al. | ............. 375/240.12 |
| 2010/0322314 A1* | 12/2010 | Huang et al. | ............. 375/240.16 |

FOREIGN PATENT DOCUMENTS

WO 2007/094630 A1 8/2007

* cited by examiner

*Primary Examiner* — William C Vaughn, Jr.
*Assistant Examiner* — Jerry Jean Baptiste
(74) *Attorney, Agent, or Firm* — Canon USA Inc. IP Division

(57) ABSTRACT

The invention relates to a method of reconstructing pixel values of a video frame for concealing corrupted pixel values. The method comprising receiving, by a receiving unit, of a signal from a communication channel and delivering by the receiving unit of video packets comprising pixel values possibly corrupted with errors; associating confidence levels with pixel values comprised in the video packets as delivered by the receiving unit; and reconstructing pixel values usable for display from the received pixel values, wherein a reconstructed value for a given pixel is obtained from the received values of a set of pixels, including the given pixel, weighted by their associated confidence levels.

The invention allows for better reconstruction of corrupted pixel values and reduces the perceived distortion when displaying the video frame.

12 Claims, 4 Drawing Sheets

ERROR CONCEALMENT METHOD FOR WIRELESS COMMUNICATIONS

CROSS REFERENCE TO RELATED APPLICATIONS

This application claims the benefit under 35 U.S.C. §119(a)-(d) of United Kingdom Patent Application GB1112017.7, filed on Jul. 13, 2011 and entitled "Error concealment method for wireless communications".

The above cited patent application is incorporated herein by reference in its entirety

BACKGROUND OF THE INVENTION

1. Field of the Invention

This invention relates to the field of wireless communication of information and more particularly to wireless communication of uncompressed video data.

2. Description of the Background Art

US patent application 2009/0021646 discloses a system and a method of communicating uncompressed video information that facilitates the application of error concealment schemes particularly when a receiver has limited buffering memory. The method consists in partitioning neighboring (spatially correlated) pixels into a predetermined number of different partitions and placing pixels from the different partitions into different packets for transmission. Then, if pixel information in a received packet is corrupted (lost or damaged), one or more other packets which contain pixels that are spatially correlated to the corrupt pixel(s) can be used to recover the corrupt pixel information.

The disclosed system provides a best effort error concealment scheme that uses pixel information contained in error free received packets to recover missing information.

The present invention has been devised to improve the error concealment effect with no additional information overhead compared to known error concealment schemes, particularly as taught by the above cited prior art.

SUMMARY OF THE INVENTION

To this end, the present invention provides according to a first aspect an apparatus for reconstructing pixel values of a video frame comprising:

a receiving unit adapted to receive a signal from at least one communication channel and to deliver video packets comprising pixel values possibly corrupted with errors;

a confidence estimation unit adapted to associate confidence levels with pixel values comprised in the video packets as delivered by the receiving unit; and a processing unit configured to reconstruct pixel values usable for display from the received pixel values, wherein a reconstructed value for a given pixel is obtained from the received values of a set of pixels, including the given pixel, weighted by their associated confidence levels.

According to this first aspect, pixel value which is detected as corrupted or of insufficient quality is not discarded but is included in the reconstruction. This advantageously makes it possible to use at best all received information and leads to a better reconstructed pixel value and reduces visual distortion at display.

Particularly, the processing unit is configured to select one of a plurality of possible reconstruction strategies in dependence upon the confidence level associated with at least one pixel value of the set of pixels.

In one implementation, the reconstructed value for the given pixel is equal to the received value of that given pixel if the confidence level associated with the received value of the given pixel is above a first threshold.

In another implementation, the reconstructed value for the given pixel is obtained by maximum ratio combining (MRC) received values of all the set of pixels if the confidence level associated with the value of the given pixel is below than or equal to the first threshold and above a second threshold.

In another implementation, the reconstructed value for the given pixel is obtained by averaging the received values of all the set of pixels, excluding the given pixel, if the confidence level associated with the value of the given pixel is below than or equal to the second threshold and the absolute value of the differences between the confidence levels of pairs of pixels of the set, excluding the given pixel, are below than or equal to a third threshold.

In another implementation, the reconstructed value for the given pixel is obtained by duplicating the received value of one pixel of the set, different from the given pixel and which value is associated with the highest confidence level in the set, if the confidence level associated with the value of the given pixel is below than or equal to the second threshold and the absolute value of at least one difference between the confidence levels of a pair of pixels of the set, excluding the given pixel, is above the third threshold.

In another implementation, the reconstructed value for the given pixel is obtained by maximum ratio combining (MRC) received values of all the set of pixels if a cyclic redundancy check (CRC) indicates one or more errors in a video packet comprising the value of the given pixel and the confidence level associated with that value of the given pixel is above a second threshold.

In one implementation, the confidence levels associated with received pixel values are based on a signal-to-noise ratio (SNR) determined for signal portions corresponding to the radio packets transporting, respectively, those pixel values.

In one implementation, the set of pixels is formed by spatially correlated pixels in the video frame.

In one implementation, the set of pixels are transported over distinct communication channels and wherein distinct communication channels correspond to different transmission time slots and/or different transmission paths.

In one implementation, the pixel values are comprised in the video packets in a raw video format.

In another implementation, the pixel values comprised in the video packets are encoded in a compressed video format.

According to a second aspect, the present invention provides a method of reconstructing pixel values of a video frame comprising:

receiving, by a receiving unit, of a signal from at least one communication channel and delivering by the receiving unit of video packets comprising pixel values possibly corrupted with errors;

associating confidence levels with pixel values comprised in the video packets as delivered by the receiving unit; and reconstructing pixel values usable for display from the received pixel values, wherein a reconstructed value for a given pixel is obtained from the received values of a set of pixels, including the given pixel, weighted by their associated confidence levels.

According to a third aspect, the present invention provides a computer program product comprising a sequence of instructions which, when executed on a processor, causes the processor to reconstruct pixel values usable for display of a video frame from received pixel values, wherein the received pixel values being comprised in video packets delivered by a receiving unit following a reception of a signal from at least one communication channel and wherein a reconstructed value for a given pixel is obtained from the received values of a set of pixels, including the given pixel, weighted by confidence levels associated with the values of the set of pixels.

According to a fourth aspect, the present invention provides a computer readable storage medium storing a program executable by a processor for reconstructing pixel values of a video frame, the program when executed causing the processor to reconstruct pixel values usable for display of a video frame from received pixel values, wherein the received pixel values being comprised in video packets delivered by a receiving unit following a reception of a signal from at least one communication channel and wherein a reconstructed value for a given pixel is obtained from the received values of a set of pixels, including the given pixel, weighted by confidence levels associated with the values of the set of pixels.

According to a fifth aspect, the present invention provides a processing unit comprising:
  a processor; and
  a computer readable storage medium storing a program executable by the processor for reconstructing pixel values of a video frame, the program when executed causing the processor to reconstruct pixel values usable for display of a video frame from received pixel values, wherein the received pixel values being comprised in video packets delivered by a receiving unit following a reception of a signal from at least one communication channel and wherein a reconstructed value for a given pixel is obtained from the received values of a set of pixels, including the given pixel, weighted by confidence levels associated with the values of the set of pixels.

Another aspect of the present invention can provide a program which, when executed by a computer or processor in a receiving device, causes the receiving device to carry out the method embodying the second aspect of the invention.

Yet further another aspect of the present invention can provide a program which, when executed by a computer or processor in a receiving device, causes the receiving device to function as the apparatus described above according to the first aspect of the invention.

The program may be provided by itself, or carried by a carrier medium. The carrier medium may be a storage or recording medium, or it may be a transmission medium such as a signal. A program embodying the present invention may be transitory or non-transitory.

The particular features and advantages of the method, the computer program product, the computer readable storage medium and the processing unit being similar to those of the apparatus reconstructing pixel values of a video frame, they are not repeated here.

DETAILED DESCRIPTION OF THE INVENTION

Figure 1:
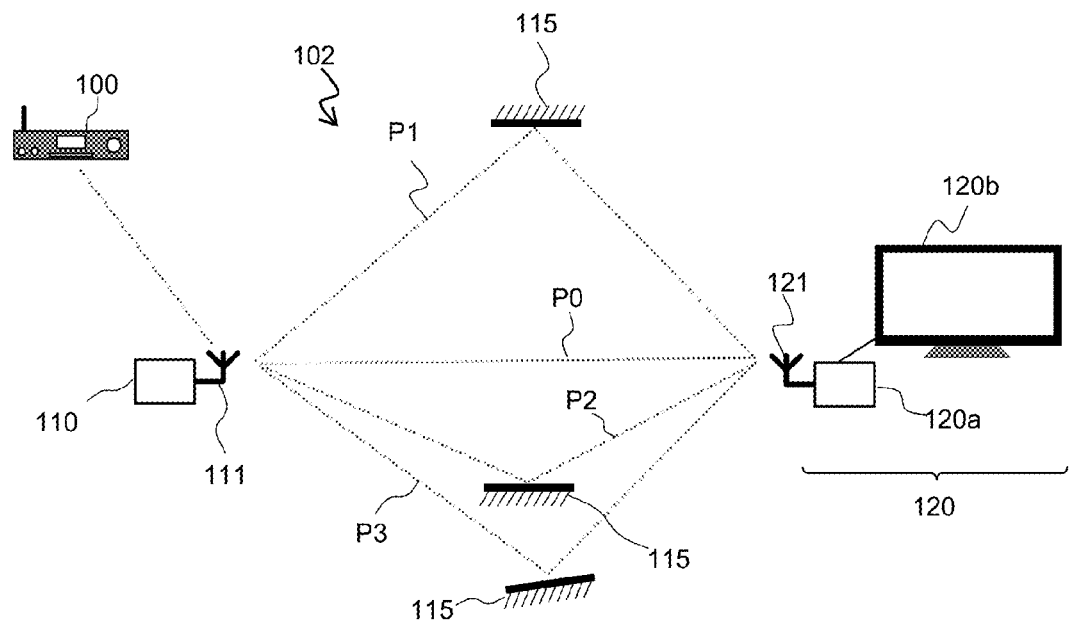
FIG. 1 depicts for illustrative purposes a wireless communication network employing spatial diversity.

FIG. 1 depicts for illustrative purposes a wireless communication network 102 employing spatial diversity. Spatial diversity relies on the use of a plurality of transmission paths between communicating devices. Typically, wireless communication network 102 operates in the unlicensed 60 GHz frequency band (millimeter waves) for providing enough bandwidth capacity to support the transport of uncompressed HD video content.

Network 102 comprises a first device 110 embodying a transmitter (Tx) and a second device 120 embodying a receiver (Rx). In this particular example, the second device 120 is composed of a communication device 120a connected to the wireless network and of a display device 120b connected to the communication device 120a for rendering the received data content, e.g. displaying the video. It is to be noted that the first device 110 may also represent a relay device, the originator of the data being then represented by another device 100 belonging to the communication network. It is common to have a meshed network comprising relay devices for relaying data between different devices to cope with the short range of the millimeter waves.

A signal emitted by antenna 111 of first device 110 may reach antenna 121 of second device 120 through a line-of-sight (LOS) transmission path P0 if it is not blocked by any obstacle. In addition, the signal may be reflected by objects 115 which may cause the establishment of a plurality of non line-of-sight (NLOS) transmission paths P1, P2 and P3.

Transmission paths P0, P1, P2, P3 may be created by different radiation patterns/configurations of antenna 111 of first device 110 and detected by different receiving patterns/configurations of antenna 121 of second device 120. A narrow beam antenna (directional antenna) can be used at the first device 110 when emitting a signal and/or at the second device 120 when receiving a signal. Steering an antenna to a given orientation corresponds to configuring its parameters (for example the weighting coefficients associated with the elements of an antenna array) such that the radiation of the signal, in case of emission, or the antenna sensitivity, in case of reception, is accentuated in that given direction relatively to other directions.

In a variant implementation of the invention, each of the first device 110 and second device 120 embodies both a transmitter and a receiver to establish a bi-directional communication. This makes it possible for example to insert feedback control information in the data flow transmitted in the reverse direction from the second device to the first device. In this implementation variant, the two devices share the same hardware platform. An apparatus based on this hardware platform is referred to generically hereinafter as a communication device.

Figure 2:
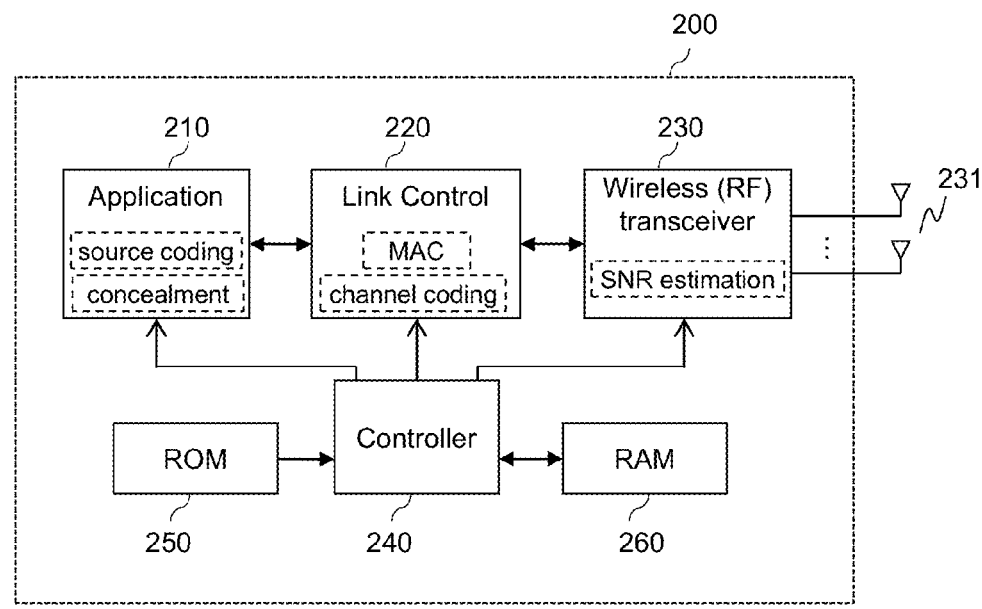
FIG. 2 illustrates a functional block diagram of a communication device that implements both a transmitter and a receiver.

FIG. 2 illustrates a functional block diagram of a communication device 200 that implements both a transmitter Tx and a receiver Rx. Communication device 200 includes a wireless transceiver (transmitter-receiver) 230, a link control unit 220 and an application unit 210, each of which is also coupled to a controller 240. The communication device furthermore includes a ROM 250 and a RAM 260 (computer readable storage medium) for data and program storage.

Typically, controller 240 is embodied as a central processing unit (CPU), which operates in accordance with a program stored in the ROM 250. The controller provides a work area in the RAM 260, and accesses and uses the work area during operation.

The wireless transceiver 230 is typically radio frequency (RF) transceiver circuitry that is connected to an antenna 231. The RF transceiver performs functions such as modulation/demodulation, signal-to-noise ratio (SNR) estimation and antenna control.

The link control unit 220 performs functions of media access control (MAC) and channel coding for protecting packets against channel errors by encoding the packets using an error correction code at the transmitter and decoding the received packets at the receiver.

When the communication device 200 is acting as a transmitter, application unit 210 generates video packets from a video bitstream delivered by a local or remote video source such as a HD player or set-top box for example. Optionally, source coding can be applied to individually compress generated video packets. A preferred embodiment of the invention for packetizing the video stream into video packets is described below with reference to FIG. 3.

When the communication device 200 is acting as a receiver, application unit 210 generates a video bitstream for display or storage for example from received video packets comprising pixel values possibly corrupted with errors. The way pixel values of the generated bitstream are reconstructed from those received in the video packets is described below with reference to FIGS. 5 and 6 according one embodiment of the invention. The reconstruction of the bitstream pixel values includes the concealment of corrupted pixel values received in video packets according to an embodiment of the present invention.

Controller 240 will normally control overall data processing over the received or to be transmitted video data, whereas signal processing operations associated with communication functions are typically performed in RF transceiver circuitry 230.

Figure 3:
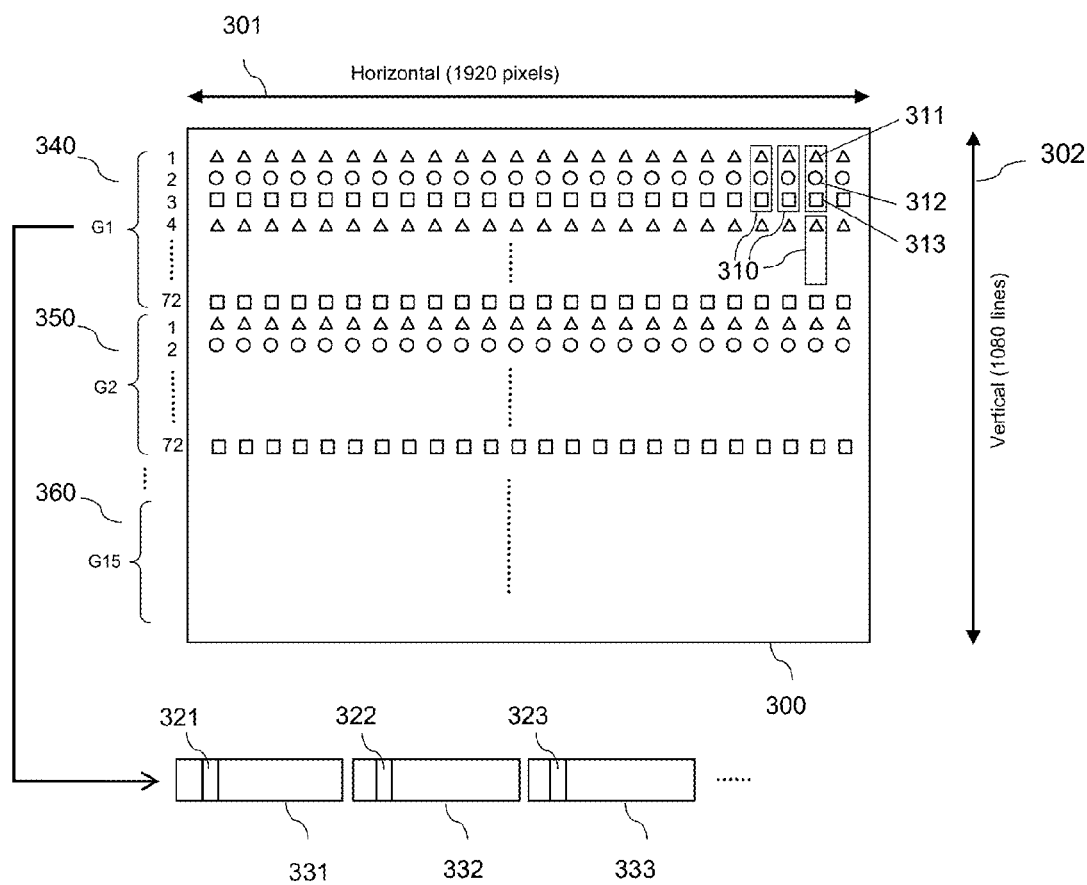
FIG. 3 shows an example of an uncompressed video frame.

Referring to FIG. 3, a method of packetizing video data according to a preferred embodiment of the invention is now described.

FIG. 3 shows an example of an uncompressed video frame 300 formed typically of 1080 lines (vertical axis 302) of 1920 pixels each (horizontal axis 301). Video frame pixels are grouped into blocks 310 of spatially correlated (neighbouring) pixels. Preferably, pixels of each block, referred to as adjacent pixels, are partitioned to different video packets and each video packet is transmitted in a different communication channel.

In the illustrated example, each of the pixel blocks 310 includes three adjacent pixels 311, 312 and 313 which are represented by different symbols. The three partitions of the different blocks are included in three different packets 331, 332 and 333. The positions 321, 322 and 323 represent the values of pixels 311, 312 and 313 of one pixel block respectively. Video frame 300 is divided into 15 groups 340, 350, . . . , 360 of 72 lines each. Pixel values of first group 340 are all transported in the three packets 331, 332 and 333. Pixels values of second group 350 are similarly partitioned to a second set of three packets (not represented) and these three packets are transmitted over different communication channels, and so on. In the present example, pixel values of the whole frame are transported into 15×3 data packets. Other partitioning of the video frame can of course also be envisaged such as grouping video frame pixels into square blocks of 4 or 9 pixels.

The partitioning of pixels into different data packets allows for a more efficient reconstructing of one degraded pixel value from the values of its adjacent pixels as it is unlikely that all packets are to be affected similarly by transmission errors. The process of reconstructing pixel values will be described in more detailed hereinafter.

The transmission of the video packets over the physical medium is controlled by the link control unit 220. Necessary protocol overhead information is appended to the video packets, in header and possibly trailer parts, thus forming physical packets, also referred to as radio packets when transmitted over a radio communication channel (cf. reference 451 in FIG. 4).

The setting up of a plurality of transmission paths in the wireless communication network 102 is advantageously used in the present invention to create a plurality of communication channels between the transmitter Tx and the receiver Rx over which are transmitted the radio packets.

Figure 4:
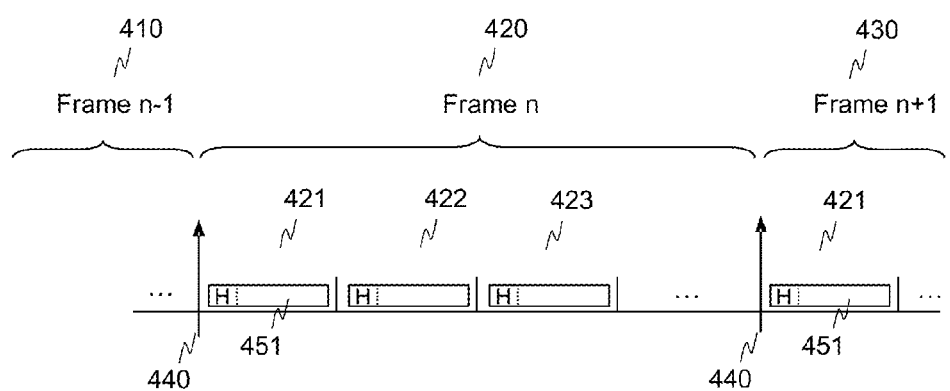
FIG. 4 depicts a time division multiplexing (TDM) used for sharing access to the radio medium.

In one embodiment of the invention, time division multiplexing (TDM) is used for sharing access to the radio medium as depicted in FIG. 4. A plurality of time slots 421, 422, 423, . . . are provided periodically in every frame 410, 420, 430. The start of a frame is signaled by means of a beacon signal 440 consisting of a predetermined pattern of data symbols. A communication channel is created by associating one given time slot of a series of frames, e.g. 421, with one given transmission path. Sending radio packets, e.g. 451, over said communication channel corresponds to configuring transmitter antenna 111 to radiate in at least the direction of the given transmission path and emitting radio signals representative of said radio packets during the given time slot 421 in the series of frames. Receiving data from said communication channel corresponds to configuring receiver antenna 121 to be sensitive in at least the direction of the given transmission path and receiving radio signals representative of said data during the same given time slot in the series of frames. Consequently, different communication channels correspond to different transmission time slots and/or different transmission paths.

In another embodiment of the invention, a frequency division multiple access (FDMA) scheme may be used for sharing the radio medium. A communication channel is then created by associating one given carrier frequency with one given transmission path. Sending data over said communication channel corresponds to configuring transmitter antenna 111 to radiate in at least the direction of the given transmission path and emitting radio signals representative of said radio packets by modulating the given carrier frequency. Receiving radio packets from said communication channel corresponds to configuring receiver antenna 121 to be sensitive in at least the direction of the given transmission path and receiving signals representative of said radio packets by demodulating the given carrier frequency. Consequently, different communication channels correspond to different carrier frequencies and/or different transmission paths.

In a further embodiment, the two above embodiments are combined. A communication channel is created by associating one given transmission path with both one given time slot of a series of frames and one given carrier frequency. Consequently, different communication channels correspond to different carrier frequencies and/or different transmission time slots and/or different transmission paths.

By way of a broad overview of the invention, a pixel whose value is detected to be corrupted or of insufficient quality is reconstructed based on the values of a set of n pixels, including the pixel to be reconstructed, weighted by estimated confidence levels associated with each value of the set of pixels. In a preferred embodiment of the invention, the set of pixels corresponds to a block of pixels, e.g. pixel blocks 310 in FIG. 3, where each pixel of the block is partitioned into a different video packet.

Let's consider Vg as the pixel value to be reconstructed into a value V'g to conceal the presence of errors introduced during the transmission of pixel Pg, where g is an index comprised between 1 and n. We have:

$$V'_g = \frac{\sum_{j=1}^{n} V_j Q_j}{\sum_{j=1}^{n} Q_j};$$

where Qj represents a quality factor or more generally a confidence level associated with a pixel value Vj and n the number of pixels in the set. The higher the confidence level, the lower the number of errors and the better is the quality.

In contrast to conventional methods, a pixel value which is detected as corrupted or of insufficient quality is not discarded but is included in the reconstruction. This advantageously allows to use at best all received information and leads to a better reconstructed pixel value.

Confidence levels associated with a pixel value can correspond to the inverse residual bit error rate (BER) of pixel data (luminance data and/or chrominance data) after channel error decoding. This pixel BER can be taken equal to the BER of the radio packet comprising that pixel value. The lower is the BER, the higher is the level of confidence. Calibrating confidence level thresholds based on BER can be performed on the perceived distortion induced by corrupted pixels.

In an alternate embodiment, confidence levels associated with a pixel value can correspond to the signal-to-noise ratio (SNR). Similarly, the SNR associated with a given pixel value can be taken equal to the SNR of the received signal corresponding to the radio packet comprising that given pixel value. The higher is the SNR, the higher is the level of confidence.

It should be noted that for a given channel coding and modulation scheme, it is well known in the art to establish a relation (curve) between the BER and the SNR. This allows for calibrating thresholds when using directly the SNR by referring to the induced residual bit error rate and thus of the perceived distortion induced by corrupted pixels.

A SNR estimation means is usually implemented by the RF transceiver unit 230. As an implementation example, the SNR estimation can be performed according to the following principle.

Most digital modulations map the data to a number of discrete points on the I/Q (magnitude/phase) plane known as constellation points. Because of noise, the magnitude/phase of a sample of received signal would likely not coincide with the theoretical constellation point corresponding to the transmitted signal sample. The distance between the actual and theoretical constellation points is indicative of the noise strength. This can be expressed as follows:

$$N = \frac{\sum_{i=1}^{k} \min_i [(S_i^* - S_i)^2]}{k};$$

where N is the noise power, k is the number of signal samples corresponding to one radio packet, min is the minimum distance between the constellation point of a received sample Si* and the closest theoretical constellation point Si.

It should be noted that the comparison is done by applying the maximum likelihood criteria, which means that the closest theoretical constellation point is used instead of the constellation point corresponding to the actually transmitted signal sample which is not available.

After estimating the noise power affecting the received signal corresponding to a radio packet, the signal to noise ratio can be estimated as follows:

$$SNR = \frac{\sum_{i=1}^{k} (S_i^*)^2}{N \cdot k}$$

FIGS. 5a, 5b, 5c and 5d illustrate different reconstruction strategies used to conceal one line of corrupted pixels (512a, 512b, 512c and 512d) according to one embodiment of the invention. Same principle applies for the reconstruction of either one pixel value or the values of a line of pixels as it is assumed that pixels of one line belong to a same partition, transmitted in a same radio packet and being subject to a same SNR. As an example, the SNR is used here as a measure of the confidence level.

Figure 5A:
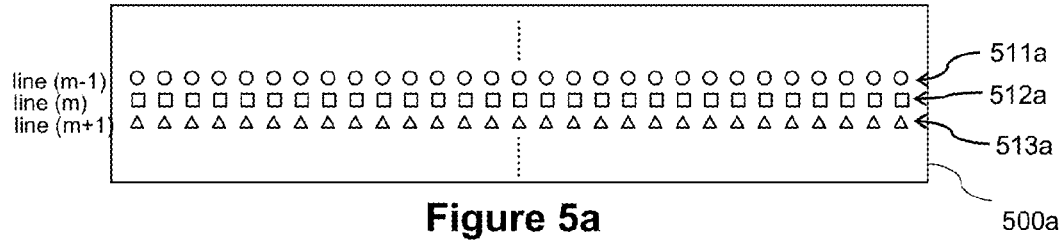
FIGS. 5a, 5b, 5c and 5d illustrate different reconstruction strategies used to conceal one line of corrupted pixels according to one embodiment of the invention.

In FIG. 5a, the SNR of the radio packet corresponding to the line 512a (line m) is assumed to be sufficiently good, i.e. SNR(m)>Th1, where Th1 corresponds to a SNR threshold above which no or a negligible number of errors remain in the video packet after channel decoding of the radio packet. In this situation no concealment is necessary and the line pixel values usable for display of line 512a are kept unchanged from the received pixel values in the video packet.

Figure 5B:
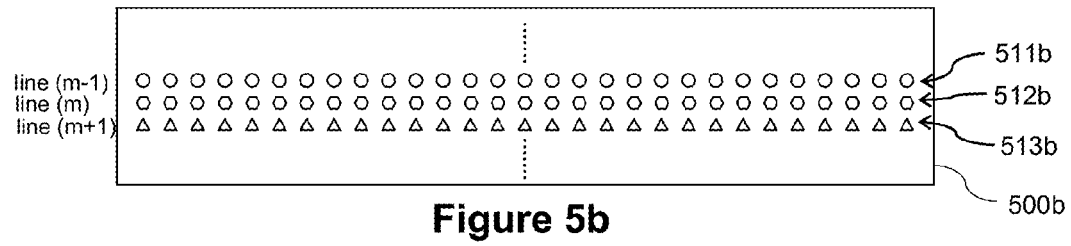

In FIG. 5b, the SNR of the radio packet corresponding to the line 512b (line m) is slightly degraded, i.e. Th1≥SNR(m)>Th2, where Th2 corresponds to a SNR threshold above which useful information is still present after channel decoding of the radio packet. In this situation, a first reconstruction strategy is applied where reconstructed pixel values usable for display of line 512b are determined by maximum ratio combining the pixel values of the three partitions (lines m−1, m, m+1) as follows:

$$V'_{i,m} = \frac{\sum_{j=1}^{n} V_{i,j} Q_{i,j}}{\sum_{j=1}^{n} Q_{i,j}} = \frac{V_{i,m-1} SNR_{m-1} + V_{i,m} SNR_m + V_{i,m+1} SNR_{m+1}}{SNR_{m-1} + SNR_m + SNR_{m+1}};$$

where V'i,m represents the reconstructed value of pixel i of line m, Vi,j represents the value of pixel i of line j, $Q_{i,j}$, represents the confidence level of pixel i of line j and SNRx the SNR associated with line x (all pixels of line x are assumed to have the same SNR because transmitted in the same radio packet). The reconstructed value of each given pixel i of line m is obtained from the received values of the set of three pixels i of lines m−1, m and m+1, thus including the given pixel i of line m, weighted by their associated confidence levels (SNR).

Figure 5C:
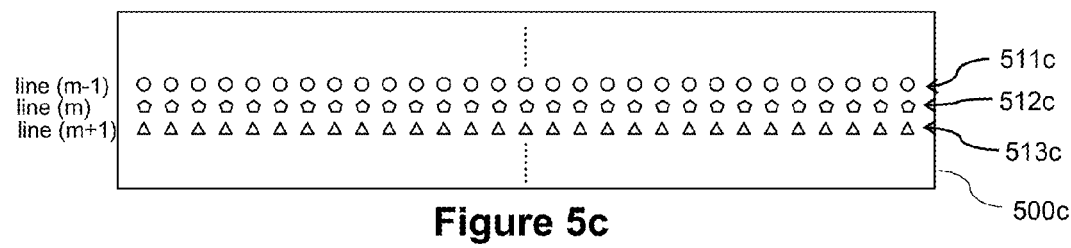

In FIG. 5c, the SNR of the radio packet corresponding to the line 512c (line m) is too degraded, i.e. Th2 SNR(m) and no useful information can be expected to be present after channel decoding of the radio packet. If the two adjacent lines m−1 and m+1 are of similar quality, i.e. |SNR(m−1)−SNR(m+1)|≤Th3, where Th3 can be set for example to 10% of Th1, a second reconstruction strategy is applied where reconstructed pixel values usable for display of line 512c are determined by averaging the pixel values of two partitions corresponding to lines m−1 and m+1 as follows:

$$V'_{i,m} = \frac{\sum_{j=1, j\neq m}^{n} V_{i,j}}{n-1} = \frac{V_{i,m-1} + V_{i,m+1}}{2};$$

In a variant implementation, the two partitions are weighted by their corresponding SNR:

$$V'_{i,m} = \frac{\sum_{j=1, j\neq m}^{n} V_{i,j} Q_{i,j}}{\sum_{j=1, j\neq m}^{n} Q_{i,j}} = \frac{V_{i,m-1} SNR_{m-1} + V_{i,m+1} SNR_{m+1}}{SNR_{m-1} + SNR_{m+1}};$$

where V'i,m represents the reconstructed value of pixel i of line m, Vi,j represents the value of pixel i of line j, $Q_{i,j}$, represents the confidence level of pixel i of line j and SNRx the SNR associated with line x.

Figure 5D:
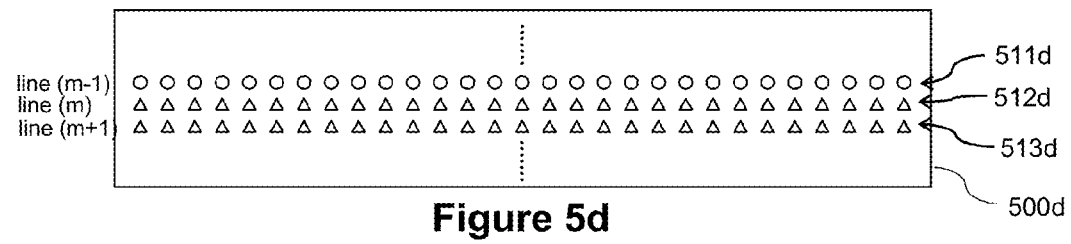

In FIG. 5d, the SNR of the radio packet corresponding to the line 512d (line m) is too degraded, i.e. Th2 SNR(m) and no useful information can be expected to be present after channel decoding of the radio packet, similarly to the case of FIG. 5c. In this scenario however it is assumed that the two adjacent lines m−1 and m+1 are of different quality, i.e. |SNR(m−1)−SNR(m+1)|>Th3. In this situation, a third reconstruction strategy is applied where reconstructed pixel values usable for display of line 512d are determined by selecting the pixel values, among the two partitions corresponding to lines m−1 and m+1, having the best SNR. In the illustrated example of FIG. 5d, line m+1 (513d) is assumed to correspond to the radio packet with the best SNR, and its pixel values are thus duplicated into line m (512d).

Figure 6:
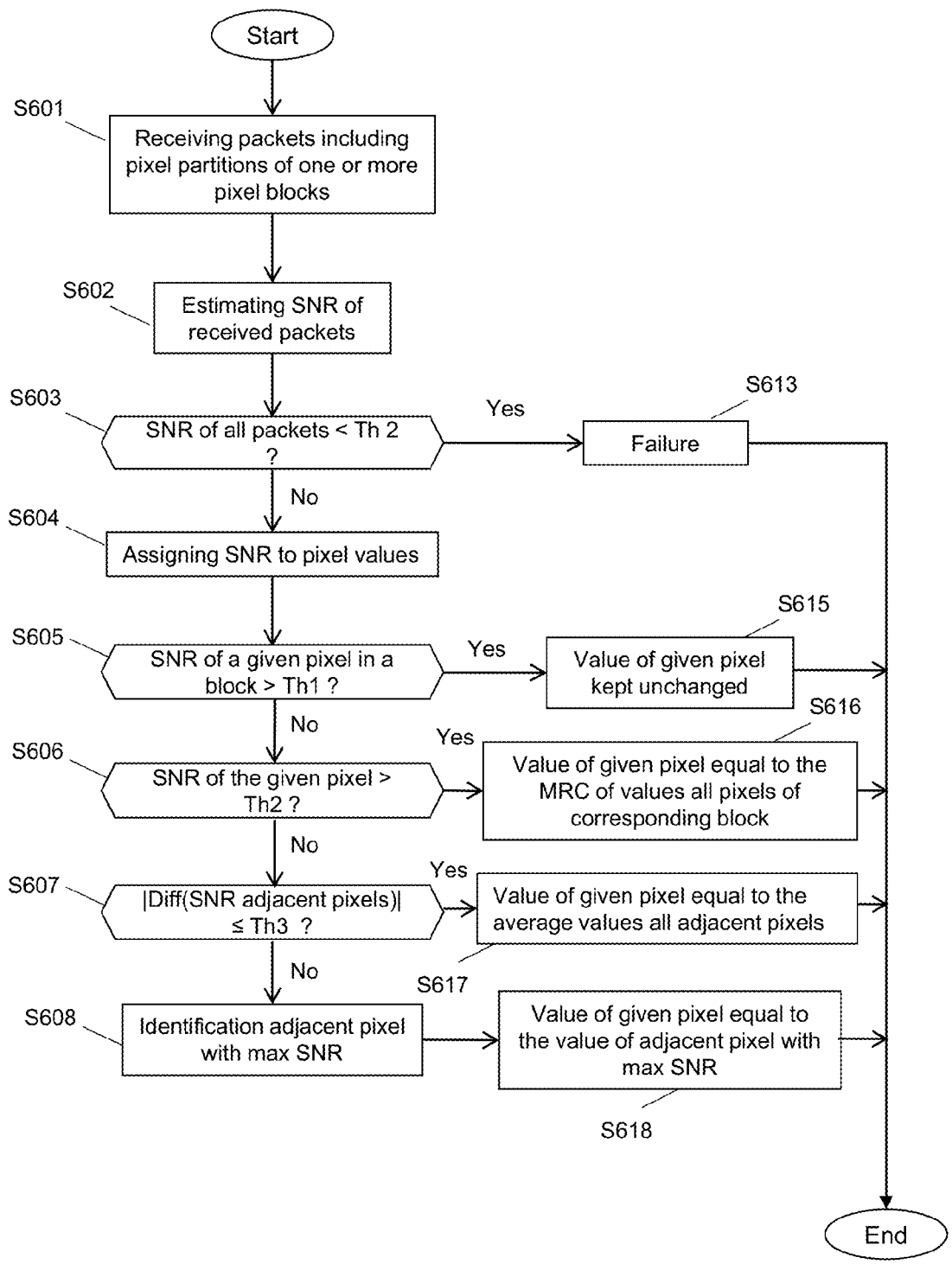
FIG. 6 is a flowchart of a segment of a program that shows how pixel values of the video bitstream are reconstructed.

As previously described, the controller 240 operates in accordance with a program stored in the ROM 250. FIG. 6 is a flowchart of a segment of the program stored in the ROM 250 of second device 120 and shows how pixel values of the video bitstream are reconstructed according to the different reconstruction strategies described with regards to FIG. 5.

At step S601, packets including pixel partitions of one or more pixel blocks are received from a receiving unit including the transceiver unit 230 and optionally the link control unit 220 for applying channel error decoding to the radio packets.

At step S602, the SNR of received packets is estimated for example by the SNR estimation means of the transceiver unit 230 using to the above described method.

A test is performed at step S603 to check whether the SNR of the different radio packets including all pixel partitions are all too degraded, i.e. SNR<Th2, where SNR threshold Th2 being as defined above. If the test is positive, it is not possible to apply the reconstruction, at least based on the pixels belonging to the set or block of pixels. It is possible to envisage here to rely on pixel values not belonging to the block of pixels if received in packets with sufficient SNR. Alternatively, a failure is detected (S613) and no reconstruction is performed.

If at least one packet has a SNR above than or equal to threshold Th2, at step S604 the SNR of that packet is assigned to the pixel values included therein.

A test is performed at step S605 to check whether the SNR of a given pixel to be reconstructed is sufficiently good, i.e.

SNR>Th1, threshold Th1 being as defined above. In this situation, no concealment is necessary and the value usable for display of the given pixel is kept unchanged from the received pixel value in the video packet (S615).

In an alternate implementation, radio packets are individually protected by an error detection code, e.g. by adding a checksum or a cyclic redundancy check (CRC). In this implementation, test S605 is considered as positive if the checksum of the received radio packet comprising the given pixel value is determined as valid and thus no error are detected.

If SNR≤Th1 or the checksum validation has failed, a test is performed at step S606 to check whether the SNR of the given pixel to be reconstructed is slightly degraded, i.e. SNR>Th2, where SNR threshold Th2 being as defined above. In this situation, the first reconstruction strategy is applied where the reconstructed value usable for display of the given pixel is determined by maximum ratio combining the different pixel values of the set or block as detailed above (S616).

If SNR≤Th2, a test is performed at step S607 to check whether the values of other adjacent block pixels are of similar quality, i.e. whether we have |Diff(SNR adjacent pixels)|≤Th3, where SNR threshold Th3 is as defined above. If the test is positive, the second reconstruction strategy is applied where the reconstructed value usable for display of the given pixel is determined by averaging the values adjacent pixels of the block (S617). If the test is negative, the third reconstruction strategy is applied where the reconstructed value usable for display of the given pixel is determined by identifying among the values of adjacent pixels the one having the best SNR (S608) and selecting that pixel value for reconstructing the given pixel (S618).

If the number of pixels per block is greater than three, at step S607 a test is performed to check whether the absolute value of all differences between the confidence levels of pairs of pixels of the set, excluding the given pixel, is below than or equal to threshold Th3. If the test is positive, the second strategy is applied (S617). If the test is negative, i.e. the absolute value of at least one difference between the confidence levels of a pair of pixels of the set, excluding the given pixel, is above threshold Th3, then the third strategy is applied (S618).

The invention claimed is:

1. An apparatus for reconstructing pixel values of a video frame comprising: a receiving unit adapted to receive a signal from at least one communication channel, the signal comprising video packets comprising pixel values possibly corrupted with errors;

a confidence estimation unit adapted to associate confidence levels with pixel values comprised in the video packets received by the receiving unit;

and a processing unit configured to reconstruct pixel values usable for display from the received pixel values, wherein a reconstructed value for a given pixel is obtained from the received values of a set of pixels, including the given pixel, weighted by their associated confidence levels, wherein the reconstructed value for the given pixel is obtained by:

maximum ratio combining (MRC) received values of all the set of pixels if the confidence level associated with the value of the given pixel is below than or equal to a first threshold and above a second threshold, and averaging the received values of all the set of pixels, excluding the given pixel, if the confidence level associated with the value of the given pixel is below than or equal to the second threshold and the absolute value of the differences between the confidence levels of pairs of pixels of the set, excluding the given pixel, are below than or equal to a third threshold.

2. An apparatus according to claim 1, wherein the reconstructed value for the given pixel is equal to the received value of that given pixel if the confidence level associated with the received value of the given pixel is above the first threshold.

3. An apparatus according to claim 1, wherein the reconstructed value for the given pixel is obtained by duplicating the received value of one pixel of the set, different from the given pixel and which value is associated with the highest confidence level in the set, if the confidence level associated with the value of the given pixel is below than or equal to the second threshold and the absolute value of at least one difference between the confidence levels of a pair of pixels of the set, excluding the given pixel, is above the third threshold.

4. An apparatus according to claim 1, wherein the reconstructed value for the given pixel is obtained by maximum ratio combining (MRC) received values of all the set of pixels if a cyclic redundancy check (CRC) indicates one or more errors in a video packet comprising the value of the given pixel and the confidence level associated with that value of the given pixel is above a threshold.

5. An apparatus according to claim 1, wherein the confidence levels associated with received pixel values are based on signal-to-noise ratios (SNR) determined for signal portions corresponding to the radio packets transporting, respectively, those pixel values.

6. An apparatus according to claim 1, wherein the set of pixels is formed by spatially correlated pixels in the video frame.

7. An apparatus according to claim 6, wherein values of the set of pixels are transported over distinct communication channels and wherein distinct communication channels correspond to different transmission time slots and/or different transmission paths.

8. An apparatus according to claim 1, wherein the pixel values are comprised in the video packets in a raw video format.

9. An apparatus according to claim 1, wherein the pixel values comprised in the video packets are encoded in a compressed video format.

10. A method of reconstructing pixel values of a video frame comprising:
    receiving a signal from at least one communication channel and delivering video packets, the signal comprising pixel values possibly corrupted with errors;
    associating confidence levels with pixel values comprised in the received video packets; and
    reconstructing pixel values usable for display from the received pixel values, wherein a reconstructed value for a given pixel is obtained from the received values of a set of pixels, including the given pixel, weighted by their associated confidence levels, wherein the reconstructed value for the given pixel is obtained by:
    maximum ratio combining (MRC) received values of all the set of pixels if the confidence level is associated with the value of the given pixel is below or equal to a first threshold and above a second threshold,
    and averaging the received values of all the set of pixels, excluding the given pixel, if the confidence level associated with the value of the given pixel is below than or equal to the second threshold and the absolute value of the differences between the confidence levels of pairs of pixels of the set, excluding the given pixel, are below or equal to a third threshold.

11. A non-transitory computer readable storage medium storing a program comprising executable instructions causing a computer to perform the method of claim 10.

12. A method according to claim 10, wherein the reconstructed value for the given pixel is further obtained by duplicating the received value of one pixel of the set, different from the given pixel and which value is associated with the highest confidence level in the set, if the confidence level associated with the value of the given pixel is below than or equal to the second threshold and the absolute value of at least one difference between the confidence levels of a pair of pixels of the set, excluding the given pixel, is above the third threshold.

* * * * *